(12) United States Patent
Tikka et al.

(10) Patent No.: US 6,684,068 B1
(45) Date of Patent: Jan. 27, 2004

(54) METHOD FOR TRANSMITTING A MESSAGE TO A MOBILE STATION

(75) Inventors: Mauri Tikka, Helsinki (FI); Hannu Pahkala, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/559,980

(22) Filed: Apr. 27, 2000

Related U.S. Application Data

(63) Continuation of application No. PCT/FI98/00856, filed on Nov. 4, 1998.

(30) Foreign Application Priority Data

Nov. 5, 1997 (FI) .................................................. 974147

(51) Int. Cl.$^7$ ........................ H04M 11/10; H04Q 7/20
(52) U.S. Cl. ................. 455/412.1; 455/413; 455/422.1; 455/424; 455/425; 455/459
(58) Field of Search .................................. 455/412, 413, 455/422, 424, 425, 426, 456, 458, 459, 461, 418, 419, 420, 422.1, 412.1, 412.2

(56) References Cited

U.S. PATENT DOCUMENTS

| | | | | |
|---|---|---|---|---|
| 5,787,357 A | * | 7/1998 | Salin | 455/466 |
| 5,802,468 A | * | 9/1998 | Gallant et al. | 455/422 |
| 5,873,041 A | * | 2/1999 | Ishii | 455/457 |
| 5,903,726 A | * | 5/1999 | Donovan et al. | 395/200.36 |
| 5,930,239 A | * | 7/1999 | Turcotte | 370/310 |
| 6,052,591 A | * | 4/2000 | Bhatia | 455/445 |

FOREIGN PATENT DOCUMENTS

| | | | | |
|---|---|---|---|---|
| EP | 748727 | 12/1996 | | |
| EP | 874529 | 10/1998 | | |
| WO | WO 94/29995 | * 12/1994 | | H04M/11/00 |
| WO | WO 97/41654 | 11/1997 | | |
| WO | WO 98/08350 | 2/1998 | | |

\* cited by examiner

*Primary Examiner*—William Trost
*Assistant Examiner*—Meless Zewdu
(74) *Attorney, Agent, or Firm*—Squire, Sanders & Dempsey L.L.P.

(57) ABSTRACT

The present invention relates to a method for transmitting a message to a mobile station, which method comprises the steps of: storing a predetermined message in a memory means, and specifying a receiver for the message stored, the receiver consisting of one or more mobile stations. In order to improve user-frieidliness associated with transmission of messages, the method comprises the steps of: specifying an area corresponding to the message stored, monitoring the location of the receiver specified for the message, and retrieving said message from the memory means and transmitting it to the user of a receiving mobile station when the receiving mobile station arrives in said area.

8 Claims, 3 Drawing Sheets

METHOD FOR TRANSMITTING A MESSAGE TO A MOBILE STATION

This application is a continuation of international application No. PCT/FI98/00856 filed Nov. 4, 1998.

BACKGROUND OF INVENTION

1. Field of the Invention

The present invention relates to a method for transmitting a message to a mobile station, which method comprises the steps of: storing a predetermined message in a memory means, and specifying a receiver for the message stored, the receiver consisting of one or more mobile stations. Furthermore, the invention relates to a mobile communication system comprising a mobile services switching centre, radio means having a data transmission connection to the mobile services switching centre for setting up a connection to mobile stations by radio signals, and memory means for storing a message designated for one or more mobile stations.

2. Description of the Related Art

In known mobile communication systems, such as the GSM system (Global System for Mobile Communications), short messages in the form of text can be transmitted to a subscriber, the system transmitting the messages to the receiver almost immediately after the sender has sent the message.

BRIEF SUMMARY OF THE INVENTION

An object of the present invention is to improve the user-friendliness of known mobile communication systems and to provide a wider range of opportunities for the subscribers of a mobile communication system for transmitting messages to other subscribers of the system or to the subscribers themselves. This objective is achieved by the method of the invention, the method being characterized by comprising the steps of: specifying an area corresponding to the message stored, monitoring the location of the receiver specified for the message, and retrieving said message from the memory means and transmitting the message to the user of a receiving mobile station when the receiving mobile station arrives in said area.

The invention is based on the idea that the user-friendliness of the mobile communication system is dramatically improved when the subscribers are given the option of specifying a reception area for messages they have transmitted. In that case, a message designated for a receiver is not transmitted to the user of a receiving mobile station until a mobile station specified as the receiver of the message arrives in the reception area. This may take place either by the mobile communication system not transmitting the message to the receiving mobile station until the receiving mobile station arrives in the reception area or, alternatively, by the mobile communication system transmitting the message at an earlier stage to the receiving mobile station, when it arrives in the radio cell in which the reception area of the message is located, for example. The receiving mobile station then transmits the message it has received to the user by a user interface not until the mobile station has arrived in the reception area. The latter alternative is advantageous in that if a mobile station which comprises a GPS receiver is in question, for example, the mobile station does not need to transmit its location co-ordinates to other parts of the system, but it can itself monitor when its location co-ordinates correspond to the reception area co-ordinates included in the message it has received.

The invention enables the subscribers of a system to store reception-area-dependent messages which are transmitted to a receiver not until/if the receiver arrives in the reception area. This opens up totally new opportunities for the use of short messages, for example. In future, the short messages can be utilized in the following ways, for example:

- at home, a wife leaves a short message in the doorway (reception area) for her husband's mobile station, the short message reminding her husband to take his briefcase with him to work,
- a message can be left for a personal mobile station at the parking place of a summer residence, the message including a request to check that the gas tap is closed and the door is locked,
- a message can be left at a certain location in the Nuuksio outdoor recreation area, all mobile stations being specified as the receivers of the message, the message including information on the attractions at the location,
- a message can be left for all mobile stations in the doorways of hospitals and airports, the message including a request to switch off the mobile phones, and
- orienteerers are able to prove to have visited control points, i.e. the reception areas in which short messages are stored, by showing the short messages received by their mobile stations.

The location of a mobile station can be detected by using any solution. Naturally, the solution used for detecting the location then affects the accuracy with which the reception area can be specified. For example, if a mobile station having a GPS (Global Positioning System) or a corresponding electronic navigation device integrated thereto is in question, then the mobile station can be arranged to transmit location information at given intervals to other parts of the system in accordance with the invention, and the location detection of the mobile station can then be based on this information.

Alternatively, in the GSM system, for example, the location of a mobile station can be detected by utilizing timing advance assigned to it by a base station, the timing advance being directly proportional to the distance between the mobile station and the base station. The mobile station can be located by combining information on the timing advance with some other information, on the sector of the base station in which the mobile station is located, for example.

Furthermore, it is conceivable that a GSM mobile station, for example, can be located using measurement results it has reported. In other words, the mobile station of the GSM system informs, at given intervals, other parts of the system of the signal strength at which it receives the signals transmitted on a broadcast channel by the six base stations it receives best. The location of the base station can then be estimated on the basis of this information.

A mobile station can also be located on the basis of measuring the propagation delay of the signals the mobile station has received from the base stations. In other words, when the base stations are mutually synchronized to transmit signals at accurately defined moments of time, the location of the mobile station can be detected by measuring the time it takes for the mobile station to receive the signals of different base stations. The mobile station can be located by determining the propagation delay to several base stations.

The most significant advantages of the method of the invention include dramatically improved user-friendliness and a wider range of opportunities to transmit messages to other users of the system, providing entirely new opportunities for the use of short messages, for example.

In a preferred embodiment of the method of the invention, specifying the area corresponding to the message comprises the steps of: entering said area, storing the message in the memory means from said area by using a mobile station, and in connection with storing the message, storing in the memory means information indicating the location of the mobile station used. The embodiment of the invention enables the reception area to be specified in an extremely simple manner which does not require map co-ordinates to be fed, for example, or the use of other auxiliary devices together with the mobile station.

Furthermore, the invention relates to a mobile communication system to which the method of the invention can be applied. The mobile communication system of the invention is characterized in that the system comprises: means for storing in the memory means information indicating a reception area corresponding to the message stored in the memory means, monitor means for monitoring the location of at least one mobile station, for which mobile station a message is stored in the memory means, and transmitter means which are responsive to the monitor means for transmitting the message stored in the memory means to the mobile station monitored when said mobile station is located within the reception area corresponding to the message in question.

The preferred embodiments of the method and mobile communication system of the invention are disclosed in the attached dependent claims 2 to 5 and 7 and 8.

BRIEF DESCRIPTION OF THE DRAWINGS

In the following, the invention will be described in more detail by way of example with reference to the accompanying figures, in which.

DESCRIPTION OF THE PREFERRED EMBODIMENTS

Figure 1:
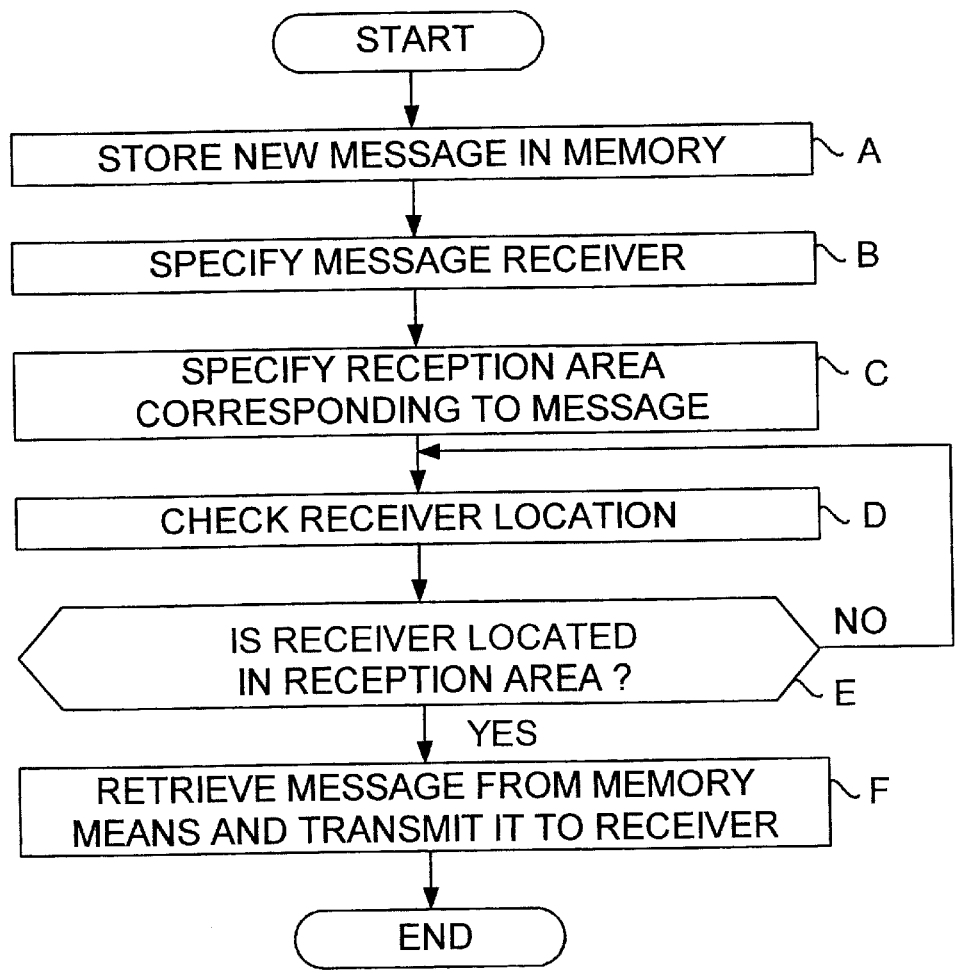
FIG. 1 shows a flow diagram of a first preferred embodiment of the method of the invention.

FIG. 1 shows a flow diagram of a first preferred embodiment of the method of the invention. A message is stored in a memory in block A of FIG. 1. The message in question may be a text message, such as a short message of the GSM system, for example, or, alternatively, a voice message dictated by a person who stores the message. The memory in which the message is stored can be located in connection with a mobile services switching centre.

In block B, a receiver is specified for the message. This can take place, for example, in such a way that the person storing the message dials the telephone number of the receiver using his telephone, whereupon the dialled number is also stored in the memory in connection with the message.

In block C, a reception area is specified for the message. If the subscriber leaving the message is then located in the area which he wishes to specify as the reception area and, in addition, the subscriber is storing the message using his mobile station, then the mobile communication system locates the subscriber and stores information on the location in the memory means in connection with the message.

In blocks D and E, the location of the receiver of the stored message is monitored. In a mobile communication system of the GSM system type, for example, this may take place in such a way that every time a new mobile station performs a location update to a new radio cell, a base station controller checks from the memory located in connection with the mobile services switching centre if therein is stored a message, the specified receiver of which is the mobile station in question and the reception area of which is located in the radio cell in question. If a stored message of this kind exists, the base station controller or some other network element starts monitoring the location of the mobile station, and if the mobile station enters the reception area, the base station controller directs the base station of the radio cell in question to transmit the message to the mobile station.

Figure 2:
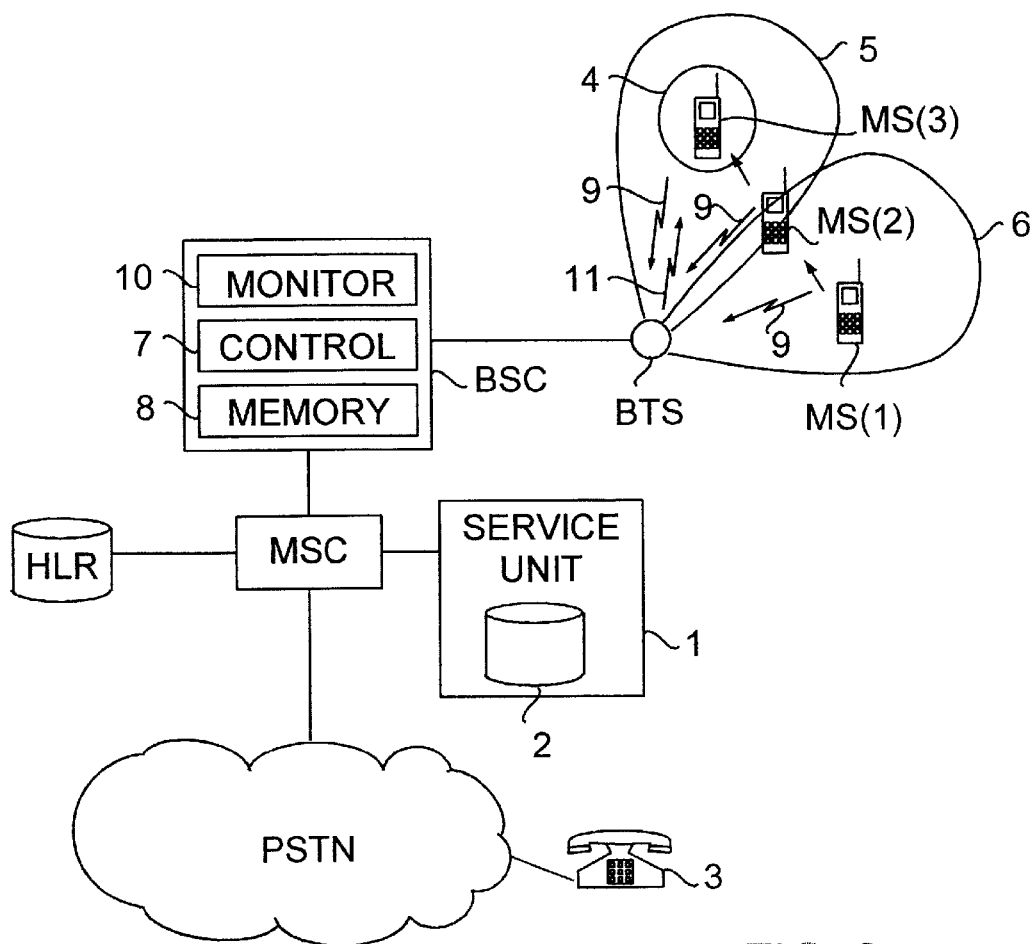
FIG. 2 shows a block diagram of a first preferred embodiment of the mobile communication system of the invention.

FIG. 2 shows a block diagram of a first preferred embodiment of the mobile communication system of the invention. The system of FIG. 2 can be based on the GSM system that has been modified in accordance with the invention, for example.

In connection with a mobile services switching centre MSC of FIG. 2 is arranged a service unit 1 and a database 2 in which a message can be stored which is designated for a particular subscriber in accordance with the invention. The message can be stored, for example, in such a way that the subscriber of a fixed telephone network PSTN calls using his telephone 3 to a given service number, whereupon his call is connected to the service unit 1. Voice messages are transmitted from the service unit to the telephone 3. By following these voice messages, the user of the telephone 3 has the opportunity to dial the telephone number of a message receiver, i.e. in the case of FIG. 2, the telephone number of a mobile station MS, by DTMF signals (Dual Tone Multi-Frequency) for example. Next, the user of the telephone 3 is able to dial the co-ordinates of a reception area 4 associated with the message, and, lastly, to dictate the voice message. The service unit 1 stores the information dialled by the user and the voice message in the database 2.

Alternatively, as distinct from the case of FIG. 2, the user can store the message in the service unit database using a computer terminal, for example. In that case, the user can specify the co-ordinates of the reception area, for example, by a map user interface by using a mouse for pointing on the map at the location he wishes to specify as the reception area.

When a connection between the telephone 3 and the service unit 1 terminates in the case of FIG. 2, the service unit 1 checks from a home location register HLR of the mobile services switching centre MSC in which cell the receiver of the message, i.e. the mobile station MS is located. In the following, it is assumed that the mobile station MS is located at a location MS(1) in a cell 6 of a base station BTS at a given time, i.e. in another radio cell than the one in which the reception area 4 is located. In that case, the service unit 1 informs a base station controller BSC of a radio cell 5 in which the reception area 4 is located about the stored message. A control unit 7 of the base station controller then stores in a memory 8 information on the fact that for the mobile station MS a message exists, and the reception area of the message is in the cell 5. In addition, it stores in the memory 8 the co-ordinates of the reception area.

In accordance with the invention, the mobile station MS comprises a GPS receiver or a receiver of some other navigation system and transmits its location co-ordinates at regular intervals in radio messages 9 via the base station BTS to other parts of the system.

When the mobile station moves from the cell 6 to a location MS(2) in the cell 5, it transmits a location update to the base station BTS. In addition, it also transmits its location co-ordinates in the radio message 9. The control unit of the base station controller BSC then detects on the basis of the location update that the mobile station MS which has arrived in the cell 5 has, according to information stored in the memory 8, a message with a reception area in the cell 5. In that case, the control unit 7 of the base station activates a monitor unit to monitor the location co-ordinates transmitted by the mobile station MS in the radio message 9 and to compare them with the co-ordinates stored in the memory 8. In addition, the monitor unit can send a message 11 to the mobile station MS over a radio path, requesting the mobile station to transmit its location co-ordinates more frequently in the radio message 9.

When the mobile station MS arrives in the reception area 4, i.e. a location MS(3), a monitor unit 10 detects this in such a way that the coordinates transmitted by the mobile station over the radio path correspond to the co-ordinates of the reception area stored in the memory 8. The monitor unit 10 then transmits a message to the service unit 1. The service unit identifies the mobile station in question on the basis of the message of the monitor unit 10 and retrieves the message stored in the database 2. Since the message is a voice message, the mobile services switching centre sets up a call between the service unit 1 and the mobile station MS, and the user of the mobile station MS hears the voice message stored for him in the reception area 4.

If, as distinct from above, a text message instead of a voice message is stored in the service unit 1 database, there is no need to set up a call between the service unit 1 and the mobile station MS, but the message can in that case be transmitted to the mobile station MS in a short message, for example.

The embodiment described in connection with FIG. 2 can also be applied to a satellite-based mobile communication system. In that case, instead of using the base station BTS of FIG. 2, the mobile station communicates directly with a satellite, and the above-described transmission of messages takes place between the satellite and the mobile station.

Figure 3:
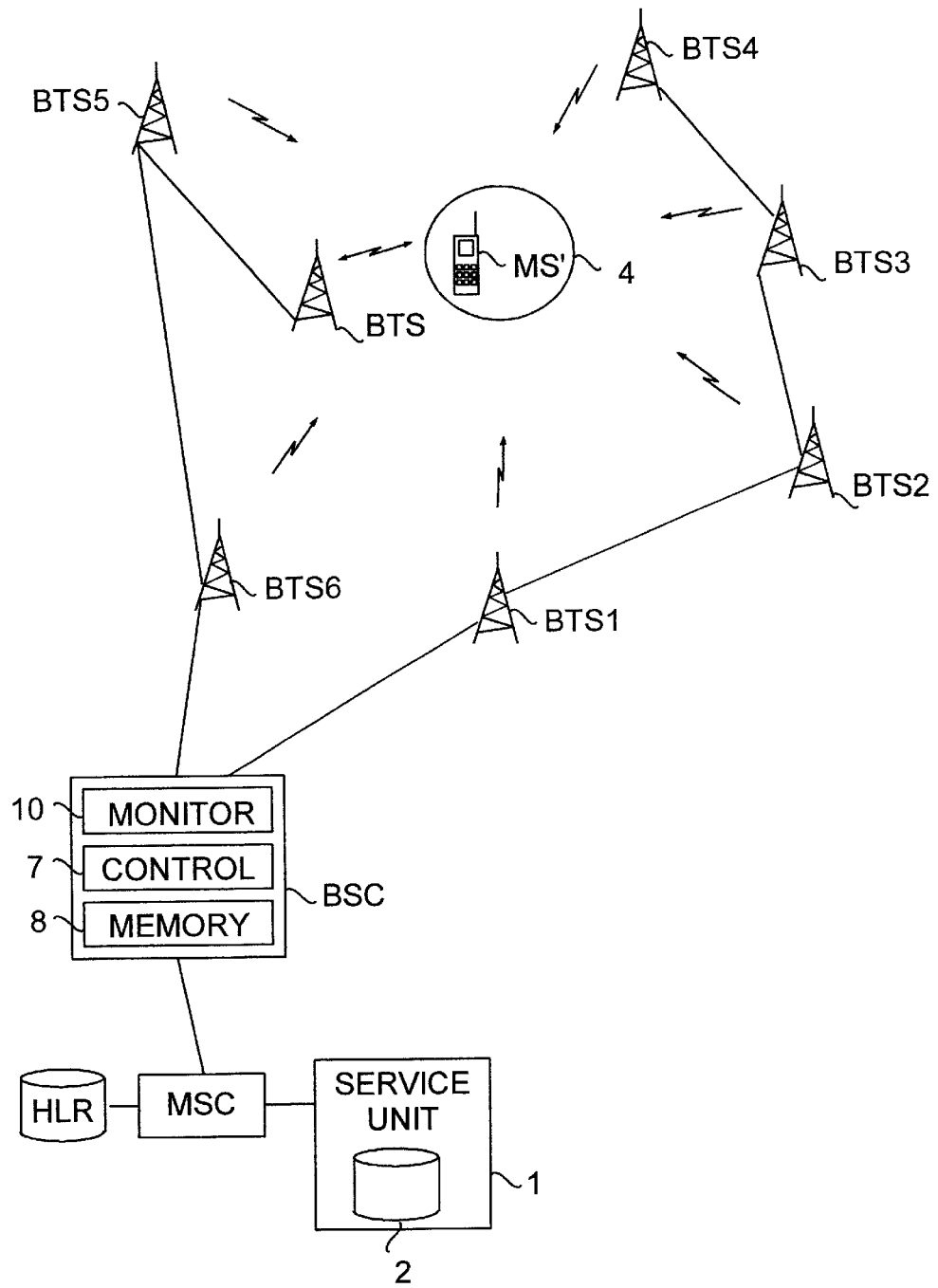
FIG. 3 shows a block diagram of a second preferred embodiment of the mobile communication system of the invention.

FIG. 3 shows a block diagram of a second preferred embodiment of the mobile communication system of the invention. The mobile communication system of FIG. 3 can be a GSM system, for example. In the case of FIG. 3, the owner of a mobile station MS' is leaving a message for another mobile station, whereby the reception area of the message is the area 4, i.e. the same area in which the mobile station MS' is located.

In accordance with the GSM specifications, the mobile station MS' continuously performs field strength (RSSI) measurements of the broadcast control channel BCCH of neighbouring cells BTS1 to BTS6. The mobile station MS' transmits measurement results in a manner known per se via the base station BTS to other parts of the network. In accordance with the invention, these measurement results can be utilized for locating the mobile station. In other words, when the owner of the mobile station MS' stores a message for some other mobile station by using the mobile station MS', the message is stored by transmitting a short message to the service unit 1 via the base station BTS. The short message includes information on for whom the message is designated, in other words, the telephone number of the mobile station MS, for example, and the text message.

When the service unit 1 receives the short message transmitted to it, it detects that the message concerned is a short message for which a reception area is to be specified. In that case, the service unit 1 transmits a message to the mobile services switching centre, asking the mobile services switching centre to transmit the latest measurement report received from the mobile station MS' to the service unit, the measurement report indicating the identifiers of the six neighbouring base stations whose signals can be best received by the mobile station MS', and the signal strength at which the mobile station MS' has received the signals of the neighbouring base stations. The service unit stores the information in question in the database 2 as information indicating the location of the mobile station. Next, the service unit 1 informs the base station controller BSC of the radio cell in which the reception area 4 is located about the message stored. The control unit 7 of the base station controller then stores in the memory 8 information indicating that for the mobile station MS a message exists, the reception area of which is in the cell 5. In addition, it stores in the memory 8 information indicating the location of the reception area, the information in this embodiment being composed of the measurement report.

Next, the base station controller BSC operates in such a way that when the mobile station MS, being specified as the receiver of the message, performs a location update to the radio cell of the base station BTS, the monitor unit 10 of the base station controller BSC starts monitoring the measurement reports transmitted by the mobile station MS. When the monitor unit 10 finally observes the measurement report transmitted by the mobile station MS, the report making reference to the same neighbouring base stations which are also referred to in the measurement report stored in the memory 8 and in which report the strength of the signals or the relations thereof correspond with a certain accuracy to the values of the measurement report stored in the memory 8, the control unit detects that the mobile station is located in the reception area. In that case the control unit 7 transmits a message to the service unit which retrieves from the database 2 the text message designated for the mobile station MS and transmits it in a short message to the mobile station MS.

If the short message that is left using the mobile station MS' is designated for all the mobile stations arriving in the reception area 4, the user of the mobile station can indicate this by dialling a specific number code instead of the telephone number of the receiving mobile station. In that case, the system of FIG. 3 operates in the above-described manner with the exception that the monitor unit 10 of the base station controller monitors all the mobile stations arriving in the radio cell of the base station, whereby the text message stored is correspondingly transmitted to all the mobile stations arriving in the reception area 4. In that case, the control unit preferably keeps a record of the ones to whom the text message is already transmitted, so that the same text message is not repeatedly transmitted to the same mobile station. This can be avoided, for example, by the monitor unit 10 which, on grounds of keeping the record, takes care of not retransmitting the same message to a particular mobile station until after an hour or, alternatively, not until the receiving mobile station has been out of the radio cell of the base station BTS.

It is to be understood that the above description and the related figures are only intended to illustrate the present invention. Consequently, the present invention can also be utilized in other mobile communication systems than the GSM system mentioned above by way of example. It will be apparent to those skilled in the art that many variations and modifications can be made to the invention without departing from the scope and spirit of the invention disclosed in the attached claims.

What is claimed is:

1. A method for transmitting a message to a mobile station, which method comprises:
   storing with a subscriber station of a telecommunication system a predetermined message in a memory means,
   specifying a receiver for the message stored, the receiver comprising one or more mobile stations:
      specifying with said subscriber station an area corresponding to the message stored,
      monitoring the location of the receiver specified for the message, and
      retrieving said message from the memory means and transmitting the message to the user of a receiving mobile station when the receiving mobile station arrives in said area.

2. The method as claimed in claim 1, comprising:
   specifying all mobile stations within the system as the receivers,
   monitoring the location of all the mobile stations approaching said area, and
   transmitting the message to the mobile stations arriving in said area.

3. The method as claimed in claim 1, wherein said message comprises a text message, preferably of a short message.

4. The method as claimed in claim 1, wherein said message comprises a voice message, whereby the method comprises the steps of:
   setting up a call to the receiver when the receiver arrives in the area, and transmitting said voice message to the receiver.

5. The method as claimed in claim 1, wherein the area corresponding to the message is specified by:
   arranging said subscriber station into said area,
   storing the message in the memory means by using said subscriber station located in said area, and
   in connection with storing the message, storing in the memory means information indicating the location of the subscriber station used for storing the message.

6. A mobile communication system comprising
   a mobile services switching center,
   radio means having a data transmission connection to the mobile services switching center for setting up a connection to mobile stations by radio signals,
   memory means for receiving and storing a message from a subscriber station of a telecommunication system, said message being designated for one or more mobile stations,
   means for storing in the memory means information from said subscriber station indicating a reception area corresponding to the message stored in the memory means,
   monitor means for monitoring the location of at least one mobile station, for which mobile station a message is stored in the memory means, and
   transmitter means which are responsive to the monitor means for transmitting the message stored in the memory means to the mobile station monitored when said mobile station is located within the reception to the message in question.

7. The mobile communication system as claimed in claim 6, wherein
   mobile station comprises location means for detecting its location and transmitter means for transmitting information indicating the location of the mobile station to the other parts of the system at predetermined intervals, and that
   the monitor means are arranged to receive the information indicating the location of said mobile station and monitor the location of the mobile station on the basis thereof.

8. The mobile communication system as claimed in claim 7, wherein the monitor means comprise means for transmitting a predetermined message to the monitored mobile station which is approaching the reception area and that said mobile station is arranged to transmit information indicating its location more frequently in response to the reception of said message.

* * * * *